(12) United States Patent
Pratt et al.

(10) Patent No.: US 7,472,919 B2
(45) Date of Patent: Jan. 6, 2009

(54) DETACHABLE TOW HOOK ASSEMBLY AND VEHICLE WITH ONE OR MORE DETACHABLE TOW HOOKS

(75) Inventors: Walter Hill Pratt, Portland, OR (US); Napolyon Isikbay, Hillsboro, OR (US)

(73) Assignee: Daimler Trucks North America LLC, Portland, OR (US)

( * ) Notice: Subject to any disclaimer, the term of this patent is extended or adjusted under 35 U.S.C. 154(b) by 338 days.

(21) Appl. No.: 11/494,415

(22) Filed: Jul. 26, 2006

(65) Prior Publication Data

US 2007/0024027 A1 Feb. 1, 2007

Related U.S. Application Data

(60) Provisional application No. 60/703,775, filed on Jul. 28, 2005.

(51) Int. Cl.
*B60D 1/18* (2006.01)
(52) U.S. Cl. .................. 280/480.1; 280/402; 280/491.1; 280/501; 280/460.1; 280/495
(58) Field of Classification Search .............. 280/480.1, 280/402, 491.1, 501, 460.1, 495
See application file for complete search history.

(56) References Cited

U.S. PATENT DOCUMENTS

| | | | |
|---|---|---|---|
| 2,435,383 A | 2/1948 | Chaffin | |
| 2,544,185 A | 3/1951 | Sargent | |
| 2,576,383 A | 11/1951 | Avery | |
| 2,685,468 A | 8/1954 | Blocker et al. | |
| 2,815,964 A | 12/1957 | Brown | |
| 2,877,025 A | 3/1959 | Jay | |
| 2,889,155 A | 6/1959 | Sandage | |
| 2,978,260 A | 4/1961 | Hebeisen | |
| 3,464,720 A | 9/1969 | Abromavage et al. | |
| 3,503,626 A | 3/1970 | Lowry et al. | |
| 3,503,628 A | 3/1970 | Lowry et al. | |
| 3,717,362 A | 2/1973 | Johnson | |
| 3,845,527 A * | 11/1974 | Lombardi | .................. 24/575.1 |
| 3,891,237 A | 6/1975 | Allen | |
| 4,078,827 A | 3/1978 | Pilhall | |
| 5,476,280 A * | 12/1995 | MacMullan | ............... 280/480.1 |
| 5,626,435 A | 5/1997 | Wohlhüter | |
| 5,716,066 A | 2/1998 | Chou et al. | |
| 5,964,475 A * | 10/1999 | Gentner et al. | .............. 280/420 |
| 6,189,910 B1 | 2/2001 | Bartel | |
| 6,402,178 B1 * | 6/2002 | Ifflaender | ................ 280/491.3 |
| 6,409,201 B1 * | 6/2002 | Riehle | ..................... 280/491.1 |
| 6,457,733 B1 * | 10/2002 | Hansen | ....................... 280/481 |
| 6,511,090 B2 | 1/2003 | Quanbeck et al. | |
| 6,527,292 B2 | 3/2003 | Adair | |
| 6,581,955 B2 | 6/2003 | Aquinto et al. | |

(Continued)

*Primary Examiner*—Joanne Silbermann
*Assistant Examiner*—Marlon A Arce Diaz
(74) *Attorney, Agent, or Firm*—Klarquist Sparkman, LLP

(57) ABSTRACT

In one embodiment a detachable tow hook assembly comprises a housing defining a passageway for detachably receiving a locking end portion of a tow hook for use in towing a vehicle. Desirably, the tow hook is inserted and rotated to a locking position for retention in place during towing of a vehicle without requiring fasteners or any retaining pins to retain the tow hook in place. Exemplary configurations for tow hooks, tow hook locking portions and tow hook receiving housings are disclosed.

30 Claims, 15 Drawing Sheets

U.S. PATENT DOCUMENTS

| | | |
|---|---|---|
| 6,672,609 B2 * | 1/2004 | Pierman et al. ............. 280/504 |
| 6,712,381 B1 | 3/2004 | Moss |
| 6,746,038 B2 | 6/2004 | McCoy et al. |
| 6,802,522 B1 | 10/2004 | Park et al. |
| 6,827,377 B2 | 12/2004 | Ferrigan |
| 6,896,281 B2 | 5/2005 | Lenzen, Jr. et al. |
| 6,902,183 B2 | 6/2005 | Rodgers |
| 6,979,016 B1 * | 12/2005 | Wegener ..................... 280/505 |
| 6,997,472 B2 * | 2/2006 | Reutlinger et al. ........ 280/491.3 |
| 7,137,658 B2 * | 11/2006 | Haneda et al. .............. 293/117 |
| 2002/0041078 A1 | 4/2002 | Aquinto et al. |
| 2004/0040995 A1 | 3/2004 | Ferrigan |
| 2004/0061310 A1 | 4/2004 | McCoy et al. |
| 2004/0124608 A1 | 7/2004 | McCoy et al. |
| 2005/0104325 A1 | 5/2005 | Rodgers |
| 2005/0110240 A1 * | 5/2005 | Dornbos ..................... 280/495 |

* cited by examiner

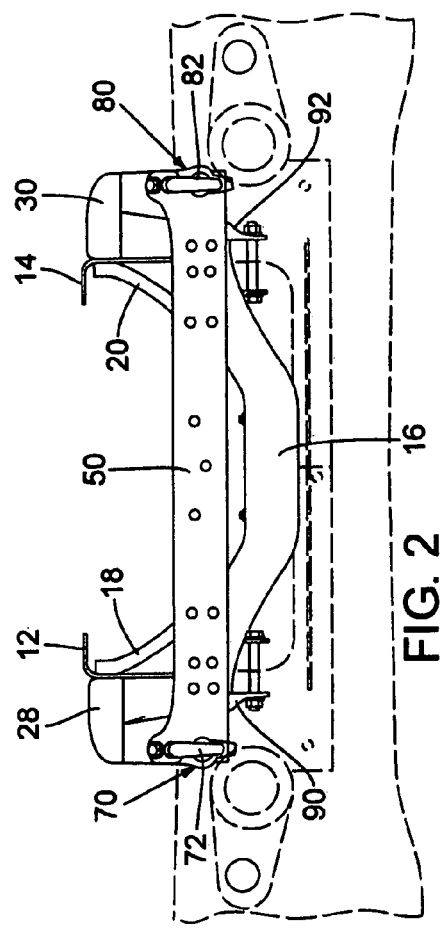
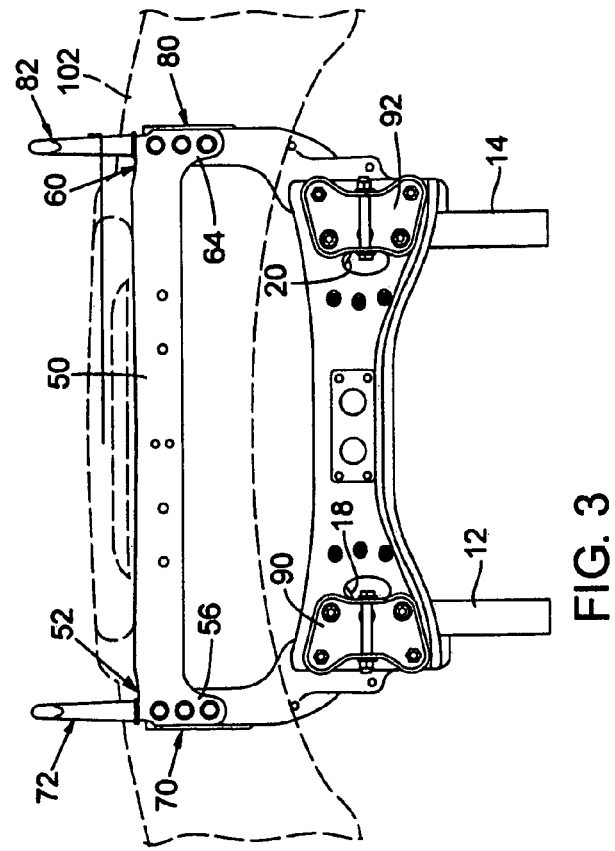

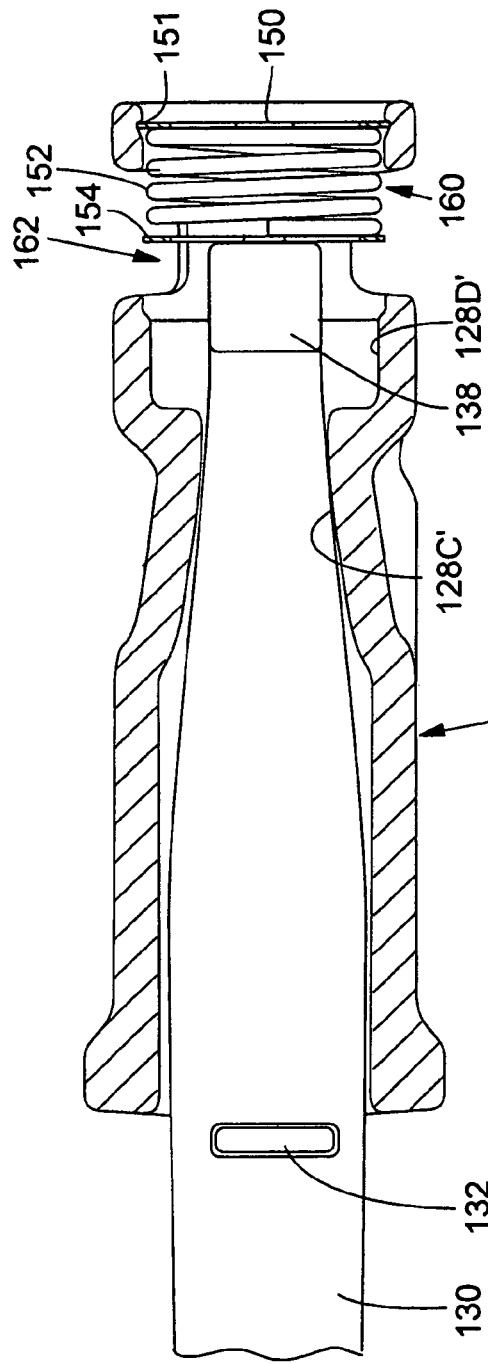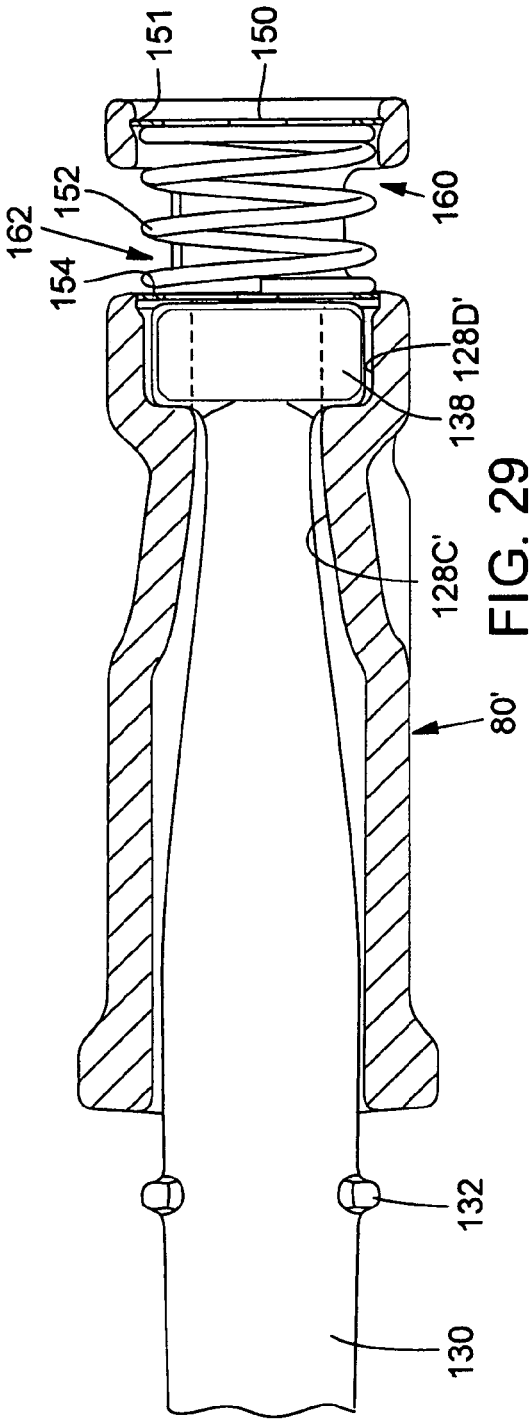

DETACHABLE TOW HOOK ASSEMBLY AND VEHICLE WITH ONE OR MORE DETACHABLE TOW HOOKS

RELATED APPLICATION

This application claims the benefit of prior U.S. provisional patent application No. 60/703,775, filed Jul. 28, 2005, entitled, "DETACHABLE TOW HOOK ASSEMBLY AND VEHICLE WITH ONE OR MORE DETACHABLE TOW HOOKS", which is hereby incorporated by reference.

TECHNICAL FIELD

The disclosure relates to a detachable tow hook assembly and to vehicles with at least one and desirably two detachable tow hook assemblies mounted in place.

SUMMARY

When a vehicle becomes disabled, especially a large vehicle such as a semi-truck tractor, locations at which to connect a tow chain or cable to the vehicle without damaging the vehicle during towing can be difficult to access or engage. In one embodiment, one or more tow hooks (and desirably two tow hooks for a heavy vehicle) are selectively coupled to a vehicle mounted receptacle (one receptacle per tow hook in this example) in the event towing is required and decoupled when towing is no longer required.

In accordance with an embodiment, at least one tow hook is insertable through an opening in a bumper and into a receiving receptacle housing coupled to a bracket. The bracket is coupled to a frame rail of the vehicle. The tow hook and housing are cooperatively structured such that the tow hook may be oriented rotationally in one orientation for insertion. The tow hook can then be rotated to a second orientation where it is locked to the housing with a hook portion projecting outwardly beyond the bumper for easy engagement by tow chain or cable. Desirably, no tools or retaining pins are required to mount and dismount the tow hook to the receptacle. Most desirably two of such tow hooks are provided each coupled to a respective associated one of the frame rails. The tow hook may comprise a stop operable to limit the depth of insertion of the tow hook into the housing so as to prevent the hook portion of the tow hook from engaging the vehicle bumper during insertion of the tow hook.

BRIEF DESCRIPTION OF THE DRAWINGS

FIG. 2 is a front view of the vehicle of FIG. 1.

FIG. 3 is a bottom view of the vehicle of FIG. 1.

In FIG. 5 the housing is shown in phantom for convenience.

FIG. 28 illustrates the tow hook of FIG. 27 fully inserted into the exemplary receptacle or housing.

FIG. 29 illustrates the tow hook of FIG. 28 following rotation to a locking position and positioning of the tow hook in a locked or vehicle towing position.

DETAILED DESCRIPTION

Figure 1:
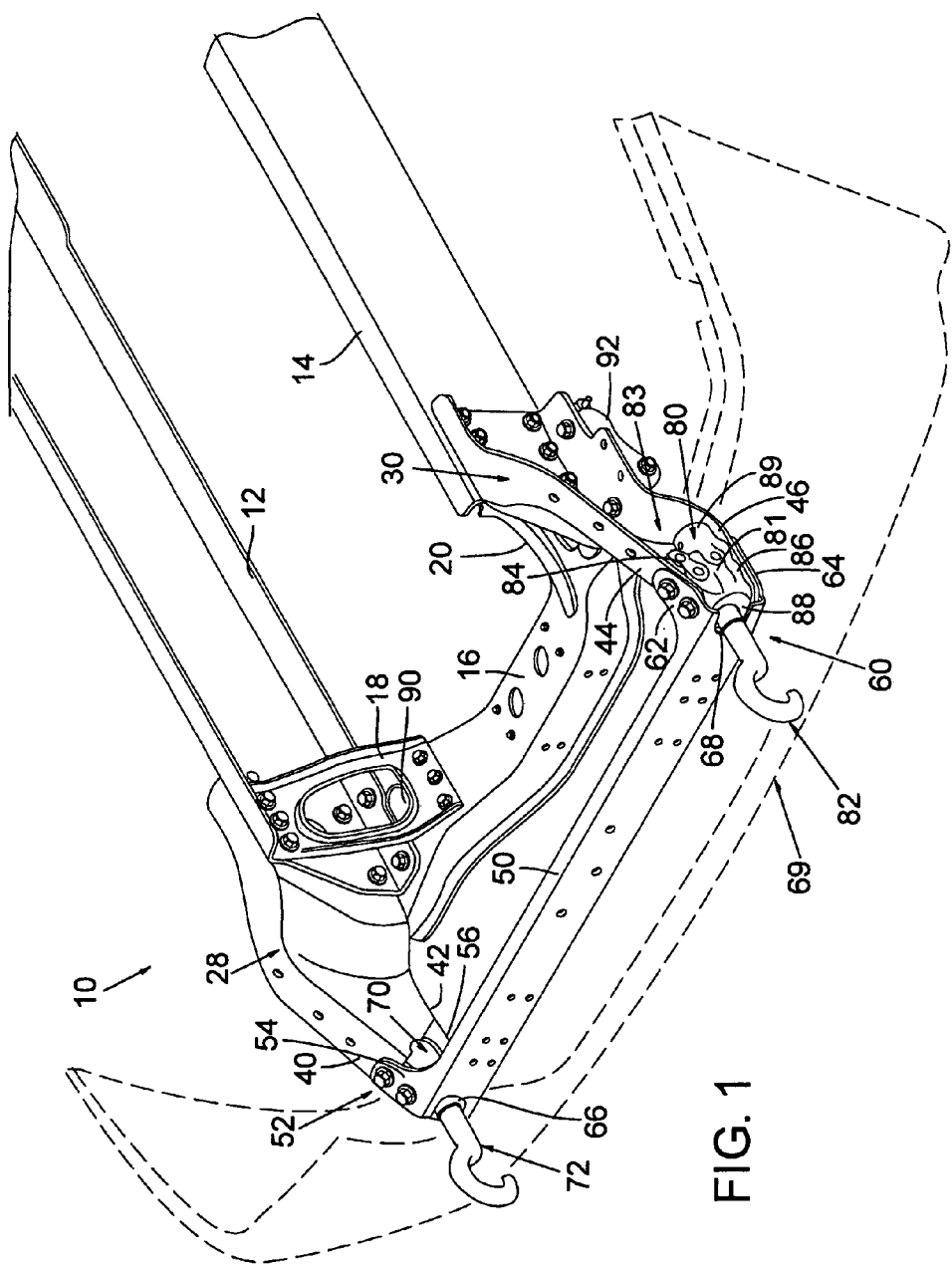
FIG. 1 is a perspective view of a vehicle with one embodiment of first and second detachable tow hooks and housing assemblies mounted in place, each such assembly being coupled by a bracket to an associated frame rail of the vehicle.

FIG. 1 illustrates an exemplary vehicle 10, which in this example comprises a large truck or large tractor trailer combination. Wheels, a cab, engine and other components of vehicle 10 are omitted from this figure for convenience. Alternatively, the tow hook assemblies can be combined with other vehicle types, such as dump trucks, other working trucks, vans and/or other vehicles. The vehicle 10 comprises first and second elongated frame rails 12, 14 which are depicted in this embodiment as parallel to one another and spaced apart. For an American style vehicle, frame rail 12 is at the passenger side (left side of the vehicle looking from outside the vehicle toward the front) while frame rail 14 is at the driver's side (right side of the vehicle looking from outside the vehicle toward the front). A cross-member 16 is coupled in this example, as by bolts, to the forward end portions of the frame rails 12, 14. A first diagonally extending reinforcing bracket 18 is coupled at an upper end portion to an upper portion of frame rail 12 and at a lower end portion to cross-member 16. A similar bracket 20 is positioned at the opposite side of the vehicle and is also coupled to the frame rail 14 and the cross-member 16. A first frame rail extension 28 is coupled to and extends forwardly from frame rail 12. A second frame rail 30 extension is coupled to and extends forwardly from frame rail 14. The rear-end portion of these frame rail extensions in this example are secured to the cross-member 16, to the associated frame rail 12 or 14, and are coupled to the associated reinforcing bracket 18 or 20. Bolts or other fasteners can be used to secure these components together.

Each of the illustrated exemplary frame rail extensions 28, 30 comprises respective upper and lower flange portions (40, 42 for extension 28 and 44, 46 for extension 30). A cross-member 50 extends between and is coupled to the forward end portions of the respective frame rails extensions 28, 30. More specifically, end portion 52 of cross-member 50 has an upper flange 54 that overlaps and is mounted to the upper flange 40 of extension 28 and a lower flange 56 that underlays (is positioned beneath) the lower flange 42 of extension 28. The respective flanges 54, 56 are coupled to the respective flanges 40, 42, such as by bolts. In the same manner, end portion 60 of cross-member 50 has an upper flange 62 that overlaps the flange 44 and a lower flange 64 (best seen in FIG. 3) that underlays (is positioned below) the lower flange 46. Flange 62 is coupled to flange 44 and flange 64 is coupled to flange 46, such as by bolts. A tow hook receiving passageway or opening 66 is provided in end portion 52 of cross-member 50. A similar tow hook receiving opening 68 is provided in end portion 60 of the cross-member 50. Openings 66,68 are desirably aligned with corresponding openings through the bumper 69.

In the embodiment depicted in FIG. 1, a tow hook receptacle 70 is disposed in a receptacle receiving pocket between flange 40, 42, the upright web between such flanges and cross-member end portion 52. A tow hook, one example of which is indicated at 72, is detachably received by the receptacle 70 as described below. Similarly, a tow hook receiving receptacle 80 is positioned in a pocket 82 between flanges 44, 46, the upright web between such flanges, and cross-piece end portion 60. A tow hook 82 is detachably received by receptacle 80. In the embodiment depicted in FIG. 1, flanges 44 and 46 converge relative to one another moving toward the front of the vehicle (e.g. flange 44 converges toward flange 46) to form a pocket 84 that narrows, and that can be wedge-shaped, moving toward the front of the vehicle, that is moving toward cross-member 50. The pocket 82 can be a mirror image (as shown) or identical to pocket 84 and receptacles 70,80 can be identical to or mirror images of one another.

The illustrated receptacle 80 comprises a housing 81 with respective lower and upper surfaces 84,86 that converge moving toward the front of the housing. The surfaces 84, 86 respectively, in this example, engage the underside surface of flange 44 and the upper surface of flange 46 with such cooperatively engaging surfaces assisting in retaining the tow hook receptacle 80 within pocket 82 against tension forces that are applied to the tow hook 82 when a tow chain is hooked up to tow hook 82.

In addition, the forward most end 88 of receptacle housing 81 is desirably of a greater cross-sectional dimension, at least in one dimension, than the cross-sectional dimension of opening 68 in such one dimension such that the forward end 88 and thus the receptacle 80 is also retained within the pocket 82 by the rear surface portions of cross-member 50 that adjoins opening 68. The illustrated housing 81 also has a rear end 89 opposite to front end 88. The housing 81 can be made of any suitable material and can be comprised of two or more parts. However, in a desirable example the receptacle 80 is of a monolithic one piece construction, such as of cast iron. The hook 82 can be of a multi-piece construction but also desirably in one embodiment is cast as a one piece monolithic tow hook of a suitable material, such as cast iron. As shown in FIG. 1, the receptacle 80 can be mounted in place within pocket 83, such as by bolts or other fasteners. Since receptacles 70 and 80 can be identical to or mirror images of one another and tow hook 72 and 82 may be identical to one another, the description below proceeds with a discussion of receptacle 80 and tow hook 82.

FIG. 2 illustrates a view of the assembly of FIG. 1 looking from the front of the vehicle. Additional brackets 90, 92, coupled to the frame rail and to the respective extensions 28, 30, are also shown in this figure. It should be noted that the illustrated form of bracket and pocket structures are optional as other structures may be utilized to mount a tow hook receptacle in place. In addition, the term "coupled" includes the direct and indirect connection between two elements. Thus, for example, receptacle 80 is coupled to frame rail 14, in this case via, for example, the frame rail extension 30. The illustrated construction is desirable, however, to provide strong and easily and reliably mounted tow hook receiving receptacles. As can be seen in FIG. 2, when the tow hooks 72 and 82 are in position for towing use, they are spaced apart from one another and are located on opposite sides of the center line of the vehicle. One or more tow chains, towing cables or ropes may be tied to the respective hooks and to a towing vehicle when the tow hooks are in place for towing use.

FIG. 3 illustrates the construction shown in FIG. 1 from below, except with a portion of the bumper 102 (in this case on the driver's side of the vehicle) removed for purposes of illustration.

Figure 4:
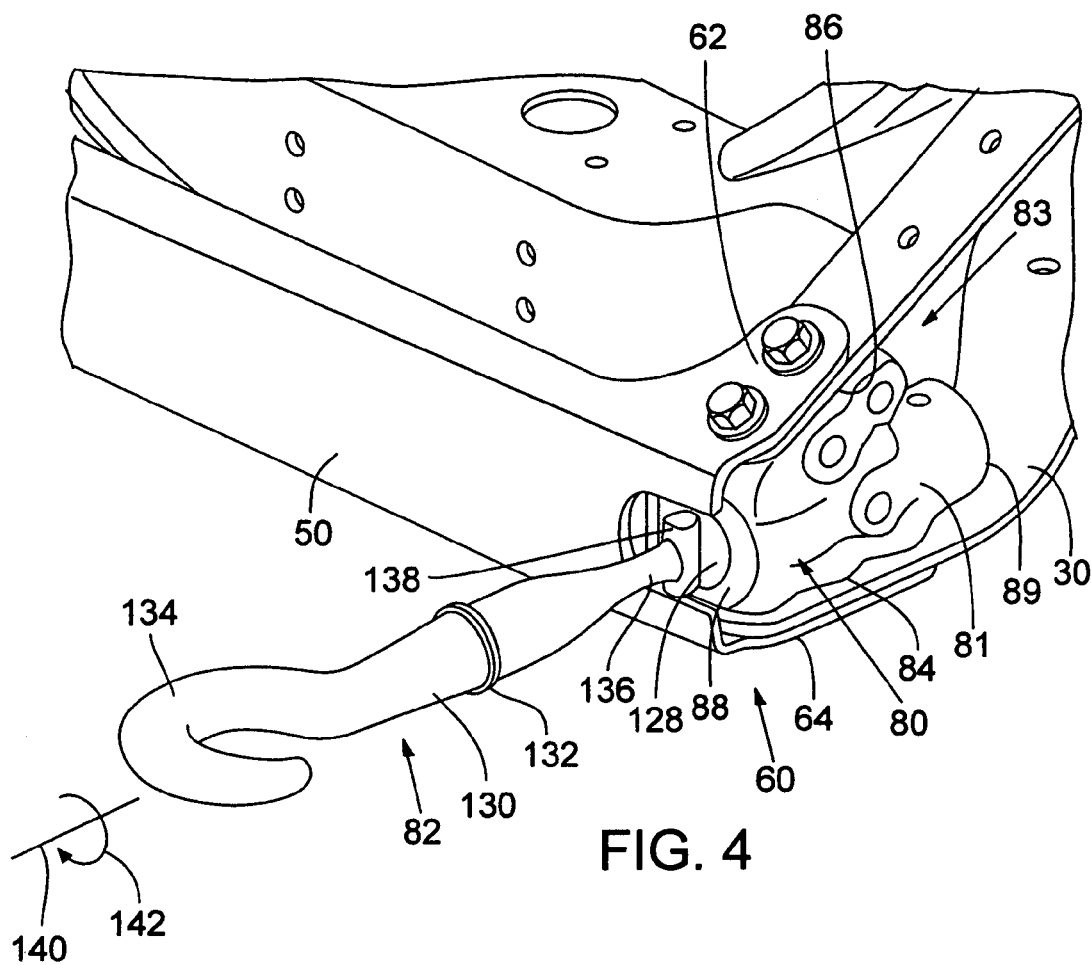
FIG. 4 illustrates an embodiment of a tow hook in position for insertion into an associated embodiment of a tow hook receiving housing with a tow hook locking portion being rotationally oriented for insertion into the housing.

With reference to FIG. 4, the tow hook 82 is shown just prior to insertion into receptacle 80 and more specifically into a tow hook receiving passageway 128 extending through end surface 88 and into the receptacle body 81. In the construction shown, passageway 128 extends lengthwise through the housing and exits through end surface 89 of the housing. The interior walls defining the passageway are configured to cooperate with the tow hook 82 to lock the tow hook into place when the tow hook is in the position shown in FIG. 1 while allowing the tow hook to be unlocked and removed from the receptacle when the tow hook has been rotated about a longitudinal axis to an orientation other than shown in FIG. 1, such as to the orientation shown in FIG. 4.

Figure 23:
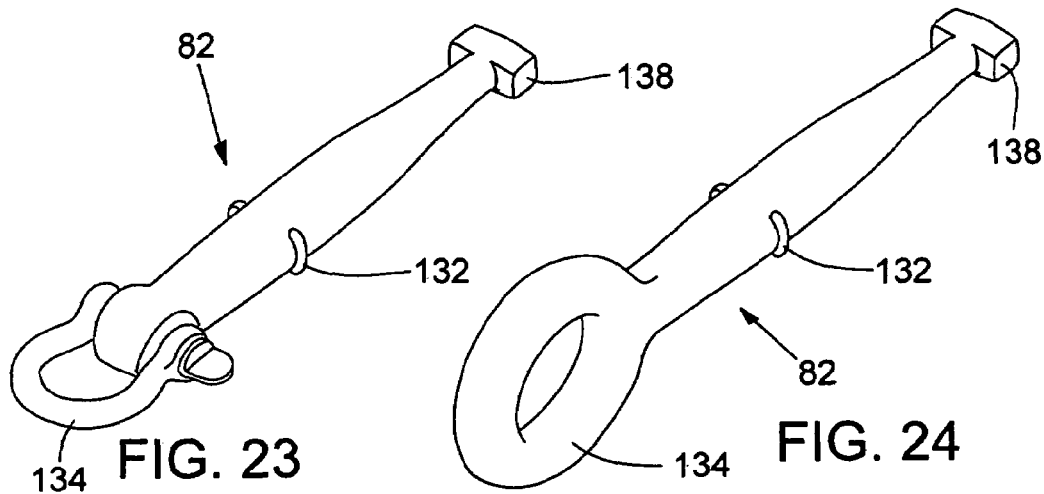
FIG. 23 illustrates a tow hook in the form of a tow chain or tow cable receiving clevis mounted to one end of a tow hook body.
Figure 24:
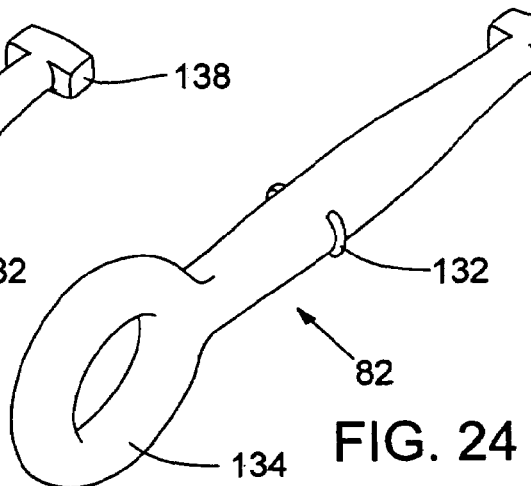
FIG. 24 illustrates a tow hook comprising a cable or chain receiving ring at one end of a tow hook body.

An exemplary tow hook 82 is shown in FIG. 4. This form of tow hook comprises a body 130 having a central portion of a circular cross section. A stop, such as an enlarged circumferentially extending ring 132 at a central portion of the body can also be provided. Stop 132 is sized to engage end 88 of receptacle housing 81 when the hook is fully inserted into the housing to limit the depth of insertion. The stop 132 thus prevents the insertion of the hook so far into the receptacle that a hook portion thereof engages and damages the vehicle bumper. The forward end of tow hook 82, indicated at 134 in FIG. 4, is shaped in a tow chain or cable receiving hook configuration. The term "tow hook" is not limited to construction with a hook 134 as the term tow hook includes construction with hook portion replaced by tow rings (see FIG. 24 for example) or other cable, chain or rope couplers (see FIG. 23 for example). The distal end of the body (the end spaced from hook end portion 134), is desirably shaped to cooperate with the internal passageway configuration of the receptacle housing to lock the tow hook in place when oriented in its locking position. In one specific configuration, the tow hook body 130 is necked or tapered at 134 adjacent to and moving toward the distal end thereof with the distal end being formed in a locking geometric shape, such as a rectangular box-like shape indicated at 138. In FIG. 4, the tow hook 82 has been rotated about its longitudinal axis 140 in the direction of arrow 142 to a position that is 90 degrees from the orientation shown in FIG. 1. The 90 degree rotation is simply an example as greater or lesser rotations may be utilized to respectively shift the tow hook from locked to unlocked positions.

Figure 15:
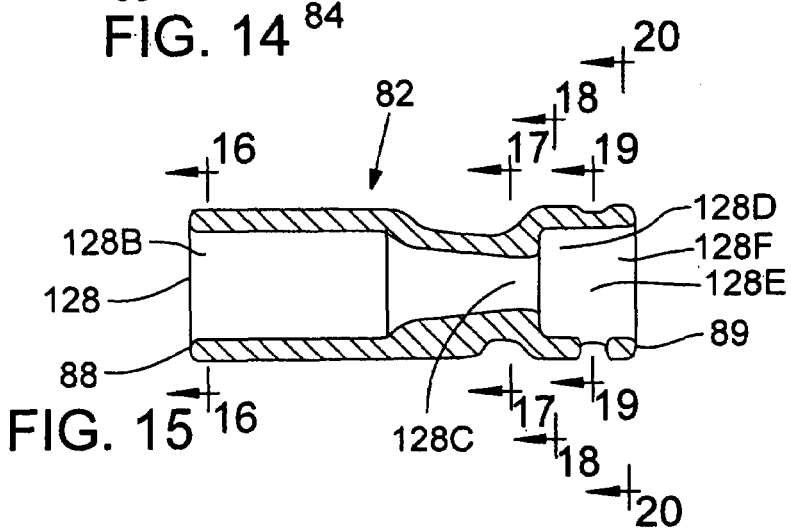
FIG. 15 is a longitudinal sectional view of the housing embodiment of FIG. 14, taken along line 15-15 of FIG. 14.
Figure 16:
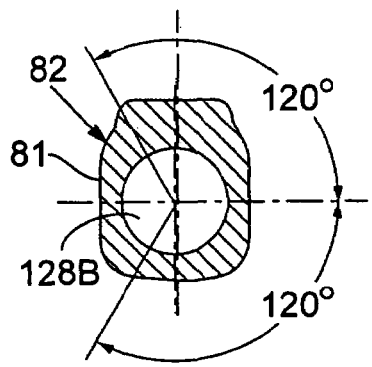
FIG. 16 is a vertical sectional view of the housing of FIG. 14, taken along line 16-16 of FIG. 15.
Figure 17:
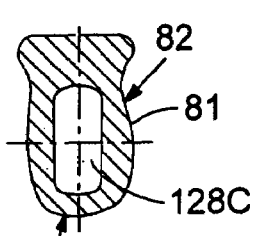
FIG. 17 is vertical sectional view of the housing of FIG. 14, taken along line 17-17 of FIG. 15.
Figure 18:
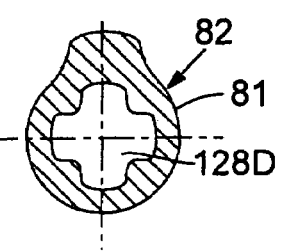
FIG. 18 is a vertical sectional view of the housing of FIG. 14, taken along line 18-18 of FIG. 15.
Figure 19:
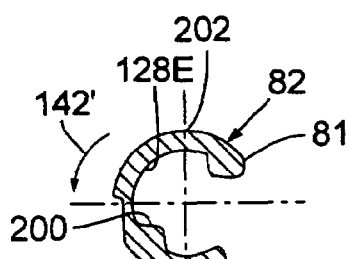
FIG. 19 is a vertical sectional view of the housing of FIG. 14, taken along line 19-19 of FIG. 15.
Figure 20:
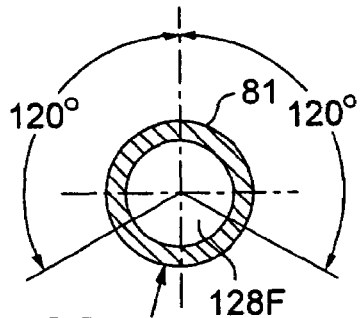
FIG. 20 is a vertical sectional view of the housing of FIG. 14, taken along line 20-20 of FIG. 15.
Figure 22:
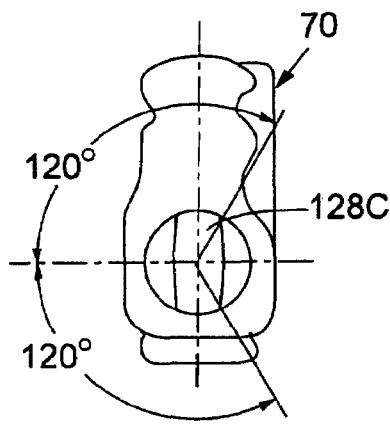
FIG. 22 is a front view of an embodiment of a housing like that of FIG. 14 for mounting at the driver's side (the right side of the vehicle looking toward the front of the vehicle) of the vehicle of FIG. 1.
Figure 21:
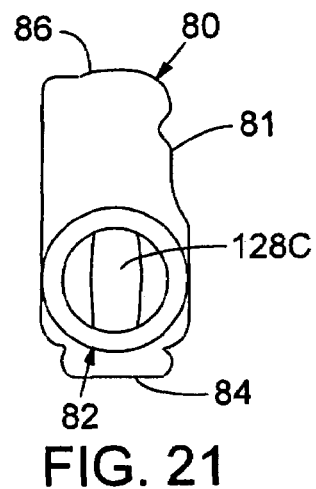
FIG. 21 is a front elevational view of an exemplarily housing similar to that of FIG. 14 for mounting at the passenger side (left side of the vehicle looking toward the front of the vehicle) of the vehicle of FIG. 1.

The exemplary tow hook receiving receptacles 70 and 80 are shown in greater detail in FIGS. 14 through 22. FIG. 21 illustrates the passenger side receptacle 70 whereas FIG. 22 illustrates the driver's side receptacle 80. As can be seen from this view, a section 128C of passageway 128 of each of these receptacles is of a generally rectangular shape and is oriented to correspond to the orientation of end portion 138 of hook 82 when the tow hook 82 is in the orientation shown in FIG. 4. Thus, the tow hook can be inserted into opening 128 through an initial passageway section 128B (see FIG. 15 and FIG. 16) of circular cross section and through the passageway section 128C (see FIGS. 15 and 17). Continued insertion of the tow hook into the receptacle results in tow hook end portion 138 passing through a section 128D (see FIGS. 15 and 18) which, in this example, is of a generally cross-like internal configuration (e.g. orthogonal rectangles). The configuration of section 128C and 128D prevents rotation of the tow hook 82 about axis 140 from the position shown in FIG. 4 as it is being inserted. Eventually end portion 138 reaches section 128E (FIGS. 15 and 19). Stop 132 limits the depth of insertion of the tow hook into the receptacle. Section 128F, at a location further inwardly beyond section 128E (see FIG. 15 and FIG. 20) in one embodiment is sized larger than the largest cross sectional dimension of hook section 138. Alternatively, a stop may be built into section 128F to limit the depth of insertion of the tow hook into the receptacle with, for example, stop 132 being eliminated.

When the tow hook has been inserted sufficiently into the receptacle to position the entire locking and section 138 of the tow hook, in this embodiment, within or beyond section 128E, the tow hook may be rotated (for example in the direction of arrow 142' in FIG. 19, which is the same as the direction of arrow 142 in FIG. 4) through, for example, 90 degrees to shift the hook to its locking position. A shelf 200 in section 128E acts as a stop to limit the extent of rotation of the tow hook in the direction of arrow 142'. The tow hook may then be moved forwardly in the receptacle (toward end 88) with tow hook locking end portion 138 entering section 128D (FIG. 18) of the receptacle 82. The tow hook is blocked from further withdrawal from the receptacle by section 128C. To unlock and remove the tow hook, the tow hook is shifted rearwardly to place section 138 in or beyond section 128E (FIG. 19). The tow hook is then rotated longitudinally in a direction opposite to arrow 142' in FIG. 19. A shelf 202 on the interior surface of section 128E limits the extent of rotation of the tow hook in this direction. This places the tow hook in the orientation illustrated in FIG. 4 so as to permit the withdrawal of the tow hook through section 128E (FIG. 19) through section 128D (FIG. 18), through section 128C (FIG. 17) and through section 128B and from the receptacle.

Figure 5:
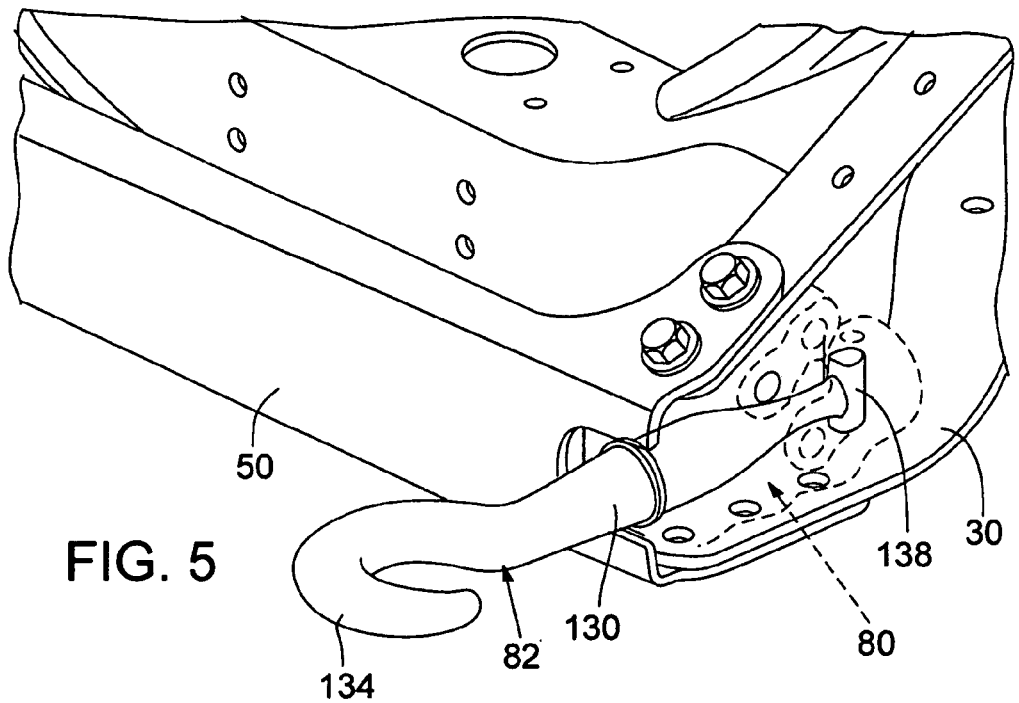
FIG. 5 illustrates the tow hook of FIG. 4 fully inserted into the housing and with the tow hook locking portion in the same rotational orientation as shown in FIG. 4.
Figure 6:
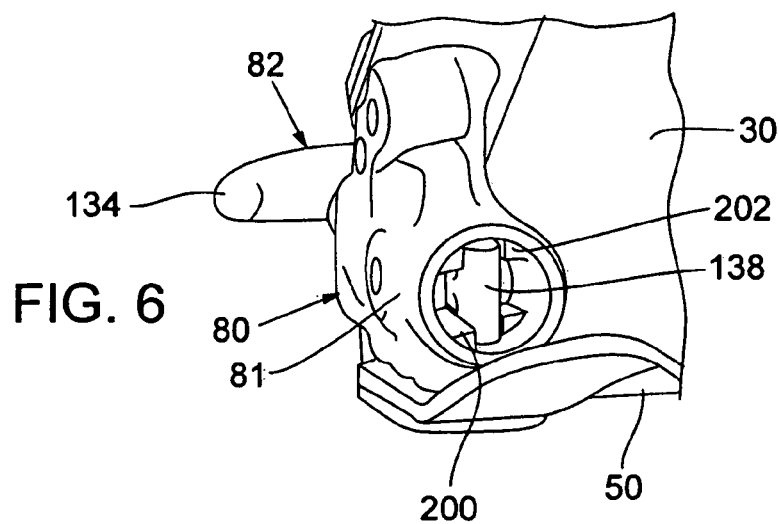
FIG. 6 illustrates a rear view of the housing with the tow hook as shown in FIG. 5 and with the tow hook inserted deep enough into the receptacle to position the tow hook locking portion in a portion of the receptacle that permits rotation of the tow hook locking portion to a locking orientation.

With reference to FIGS. 5 and 6, the tow hook 82 has been inserted to place the locking end portion of 138 in section 128E of the receptacle 80.

Figure 7:
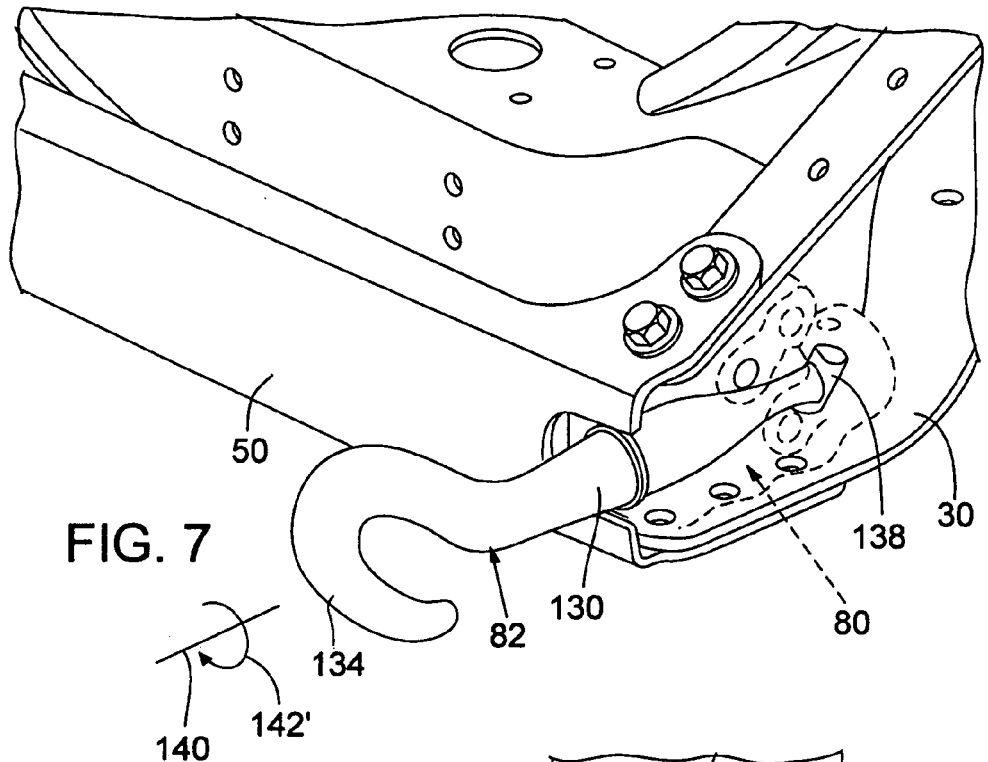
FIG. 7 illustrates the tow hook in a position partially rotated toward a locking position.
Figure 8:
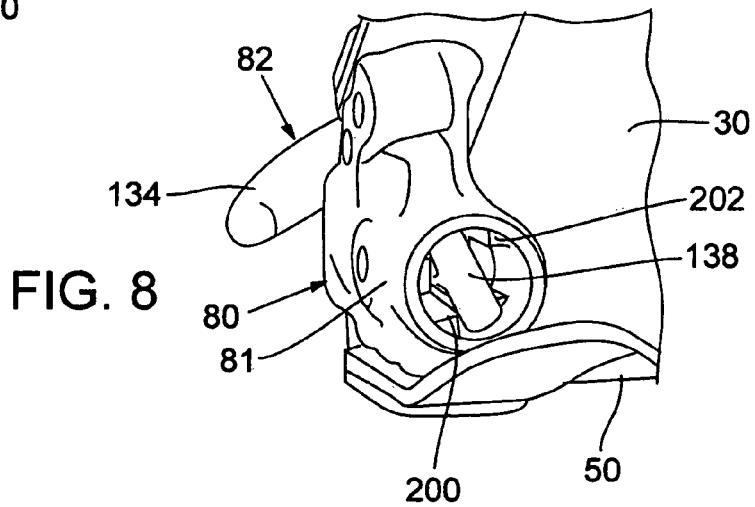
FIG. 8 illustrates a rear view of the housing with the tow hook in the position shown in FIG. 7 and with the tow hook locking portion shown partially rotated in the rotation permitting portion of the tow hook receiving housing.

FIGS. 7 and 8 show the tow hook being turned in the direction of arrow 142' about its longitudinal axis to shift the orientation of locking portion 138.

Figure 9:
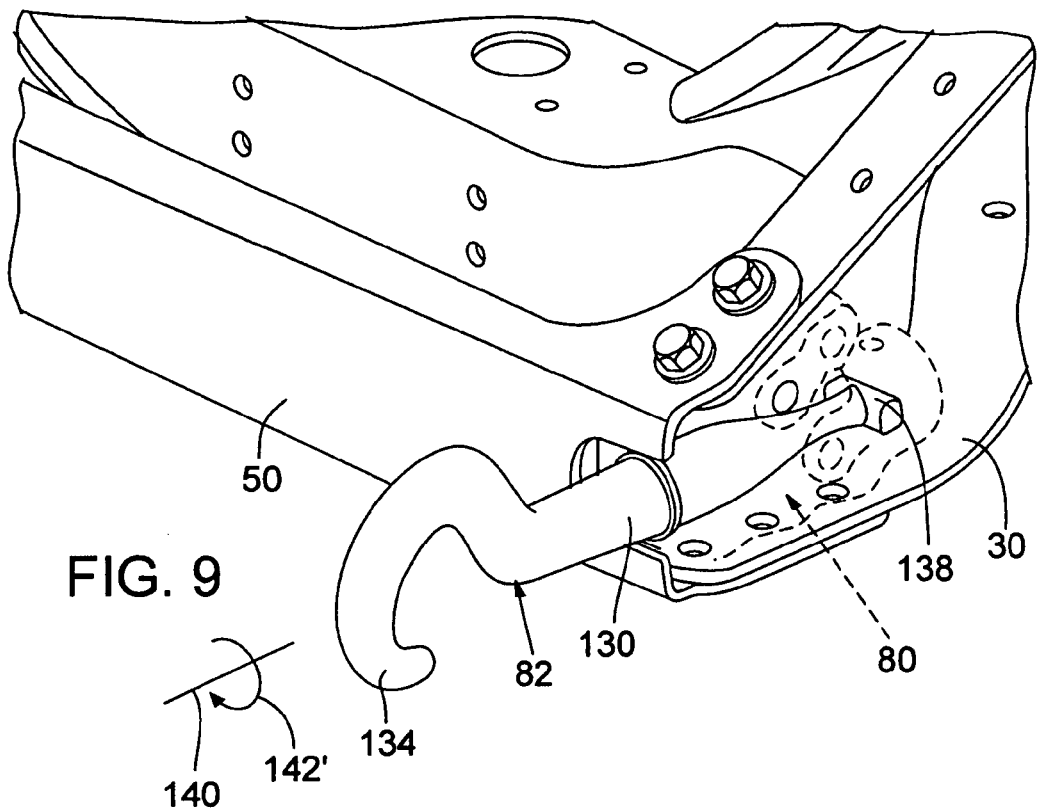
FIG. 9 illustrates the tow hook following rotation of the tow hook to position the locking portion thereof in alignment with a locking receiving portion within the housing.
Figure 10:
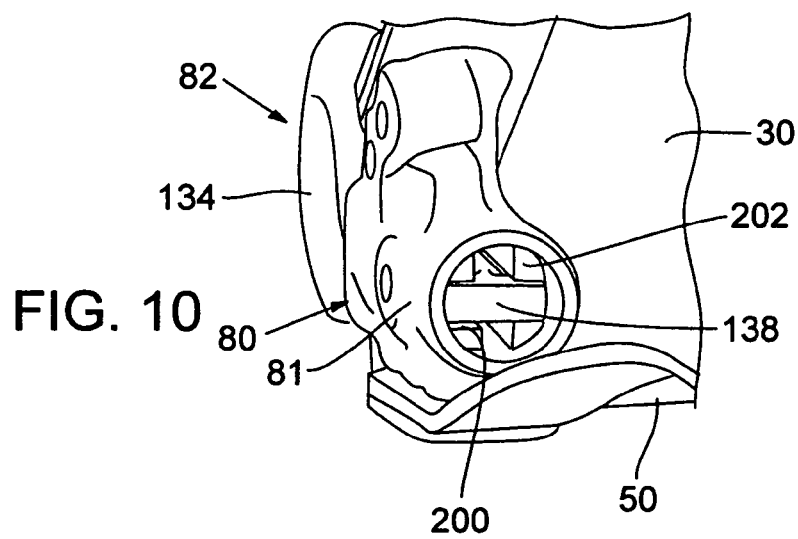
FIG. 10 illustrates a rear view of the housing with the tow hook in the position shown in FIG. 9.

FIGS. 9 and 10 illustrate the tow hook rotated in the direction of arrow 142' to a position 90 degrees from the position shown in FIG. 4. When in this position, shelf 200 is engaged by locking portion 138 of the tow hook and the locking portion is aligned with the horizontally extending box-like passageway portion of section 128D (FIG. 18).

Figure 11:
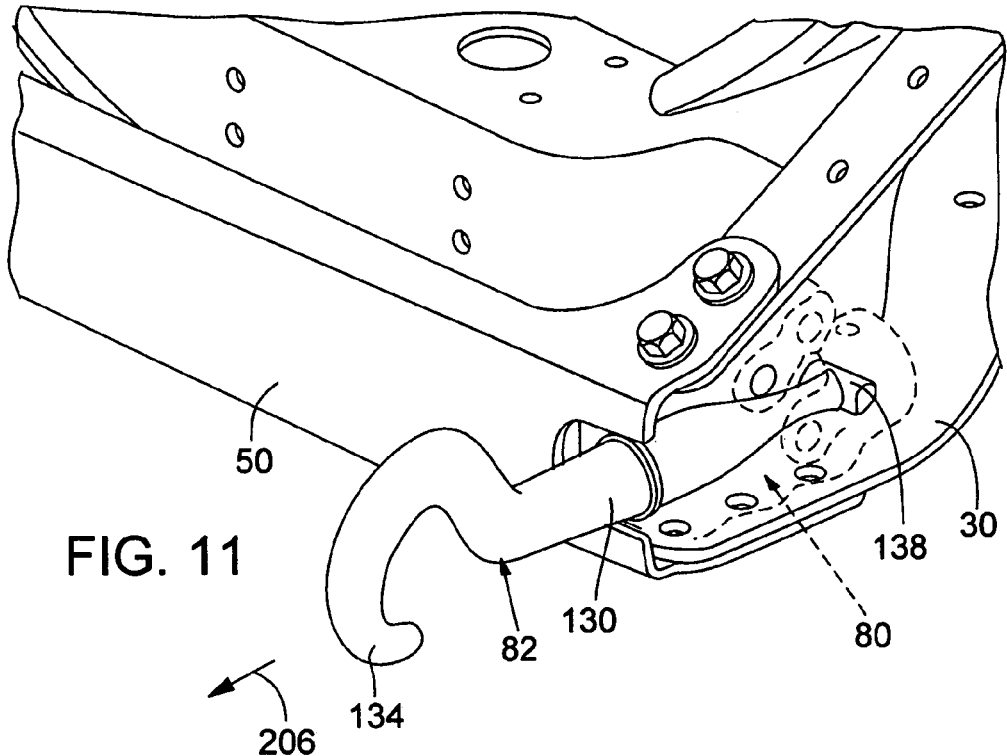
FIG. 11 illustrates the tow hook shifted forwardly (relative to the front of the vehicle) to its locking position.
Figure 12:
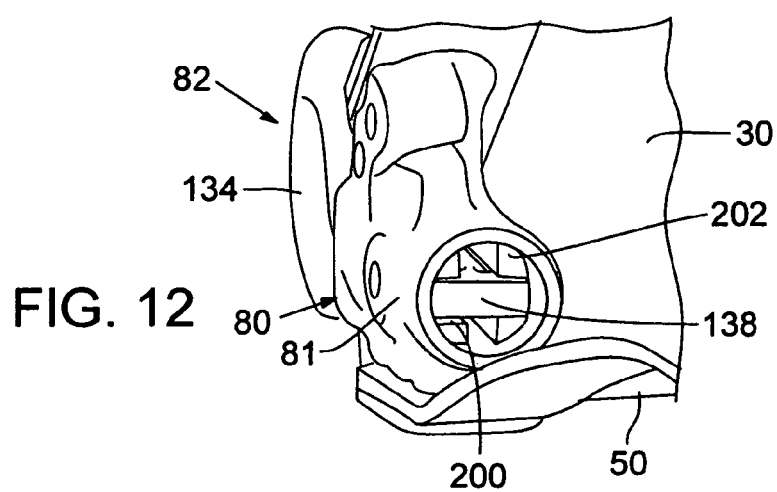
FIG. 12 illustrates a rear view of the housing with the tow hook in the position shown in FIG. 11 and the locking portion of the tow hook positioned within a locking receiving portion of the housing.

FIGS. 11 and 12 illustrate the tow hook shifted axially in the direction of arrow 206 to cause locking end portion 138 to enter section 128D (FIG. 18). Section 128D is configured to prevent further rotation of the illustrated locking end portion. In addition, section 128C prevents further motion of the tow hook in the direction of arrow 206 after the locking end portion enters the section 128D.

Figure 13:
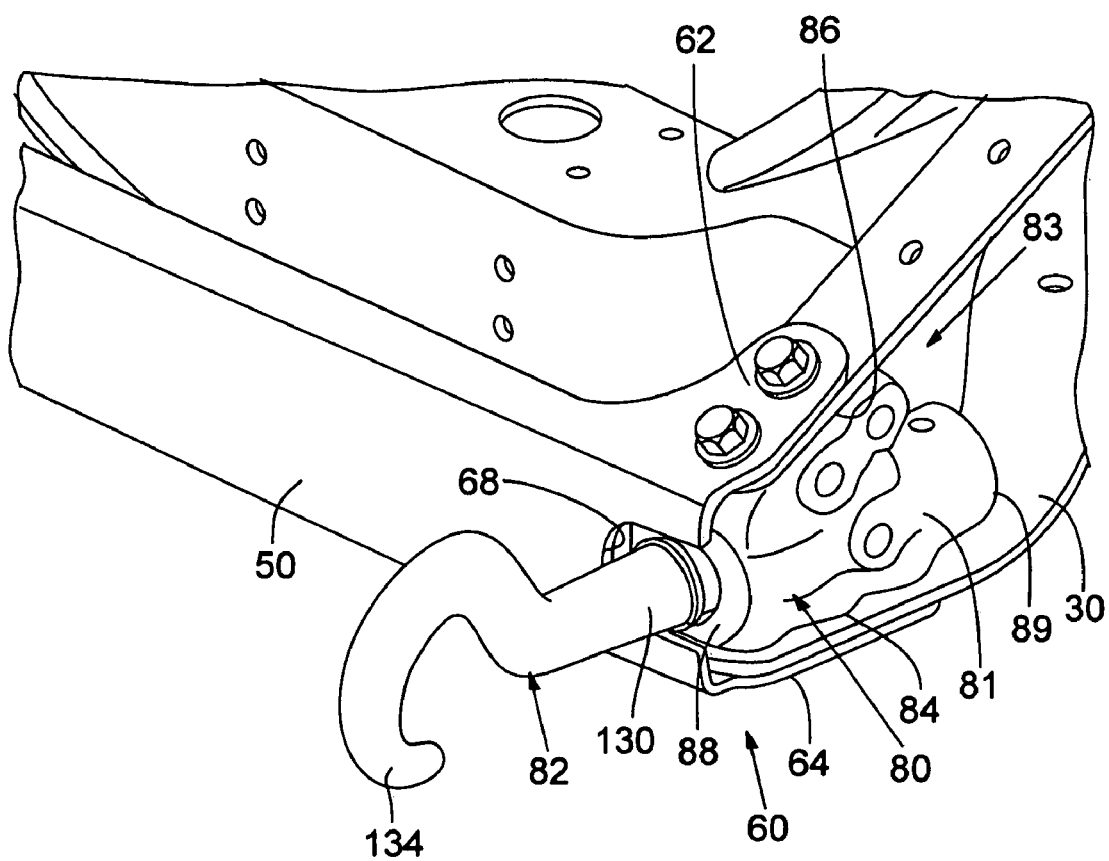
FIG. 13 is like FIG. 11 except that the tow hook receptacle is no longer shown in phantom.
Figure 14:
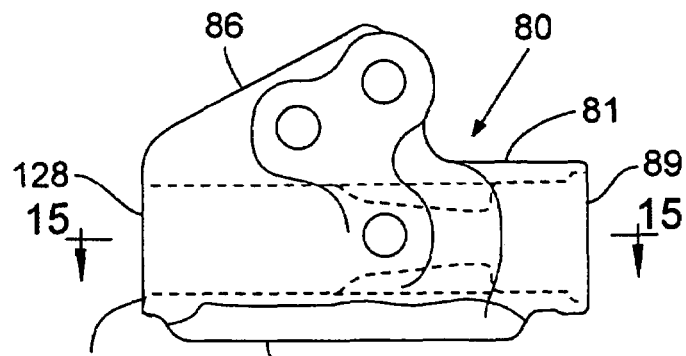
FIG. 14 is a side elevational view of an embodiment of the receptacle or housing portion of the tow hook assembly.

FIG. 13 illustrates the tow hook in its locked position ready for towing.

FIGS. 25-30 illustrate an alternative form of receptacle or housing 80' for receiving a tow hook. In these figures, elements in common with the embodiment of FIG. 4 have been given like numbers with a "'" designation and in general will not be discussed further.

Figure 25:
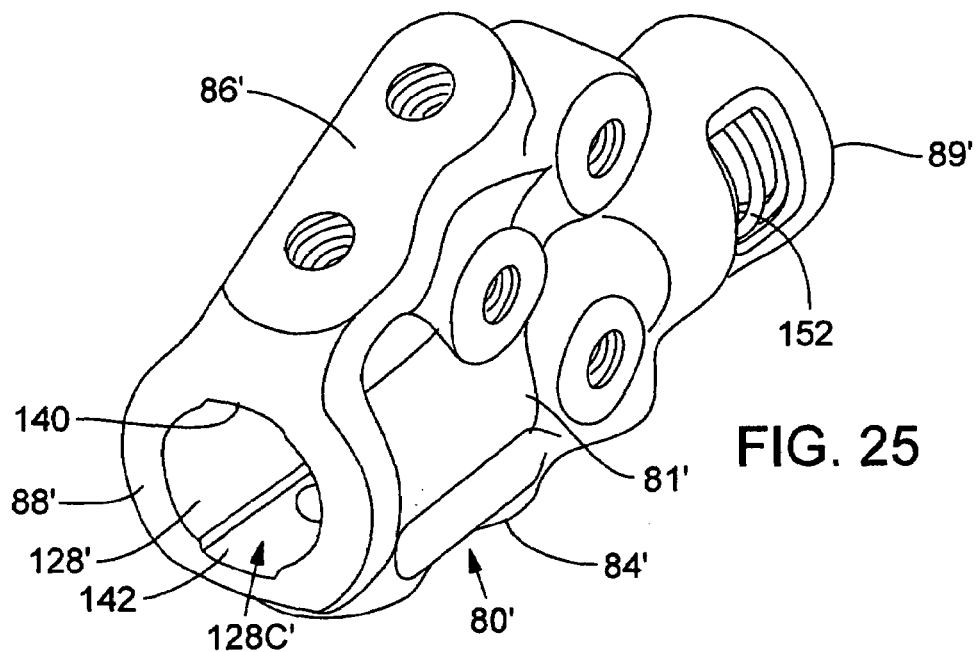
FIG. 25 illustrates an alternative embodiment of a receptacle or housing portion of a tow hook assembly.
Figure 26:
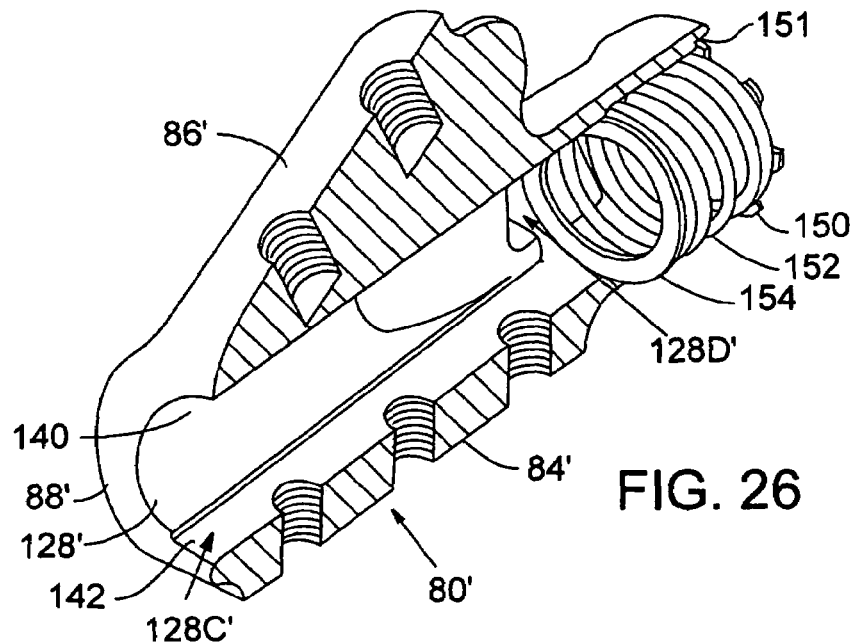
FIG. 26 illustrates a partially broken away vertical sectional view of the embodiment of the receptacle or housing portion of FIG. 25.

With reference to FIGS. 25 and 26, in this embodiment of the receptacle or housing 80', the internal housing section 126C' extends forwardly to the opening 128' of the housing. As a result, upper and lower channels 140,142 are defined within the internal passageway through the exemplary housing for receiving a tow hook locking end portion 138 when the locking end portion is oriented vertically so as to be aligned with the channels 140,142. A biasing mechanism, such as a coil spring 152, is retained within the housing 80' adjacent to the rear end 89' of the housing to assist in retaining the tow hook in its locked position during use, as explained below. FIG. 26 illustrates a portion of section 128D' of the housing within which the locking end portion 138 is positioned when rotated to the tow hook locking position. As can be seen in FIG. 6, the spring 152 is positioned within a rear spring receiving portion of the internal passageway of housing 80'. The spring is prevented from falling out of the housing at the rear thereof by a retaining ring 150 positioned within an annular ring receiving seat 151. The ring 150 can be swaged or otherwise secured in place. The ring 150 provides a bearing surface for the rear of the spring 152. A tow hook locking end engaging member 154 is positioned at the forward end of coil spring 152 so as to provide a bearing surface for his spring to bear against the locking end portion of the tow hook when in its locked position. Members 150,154 can be of any suitable material and, for example, can be of a stainless steel.

Figure 27:
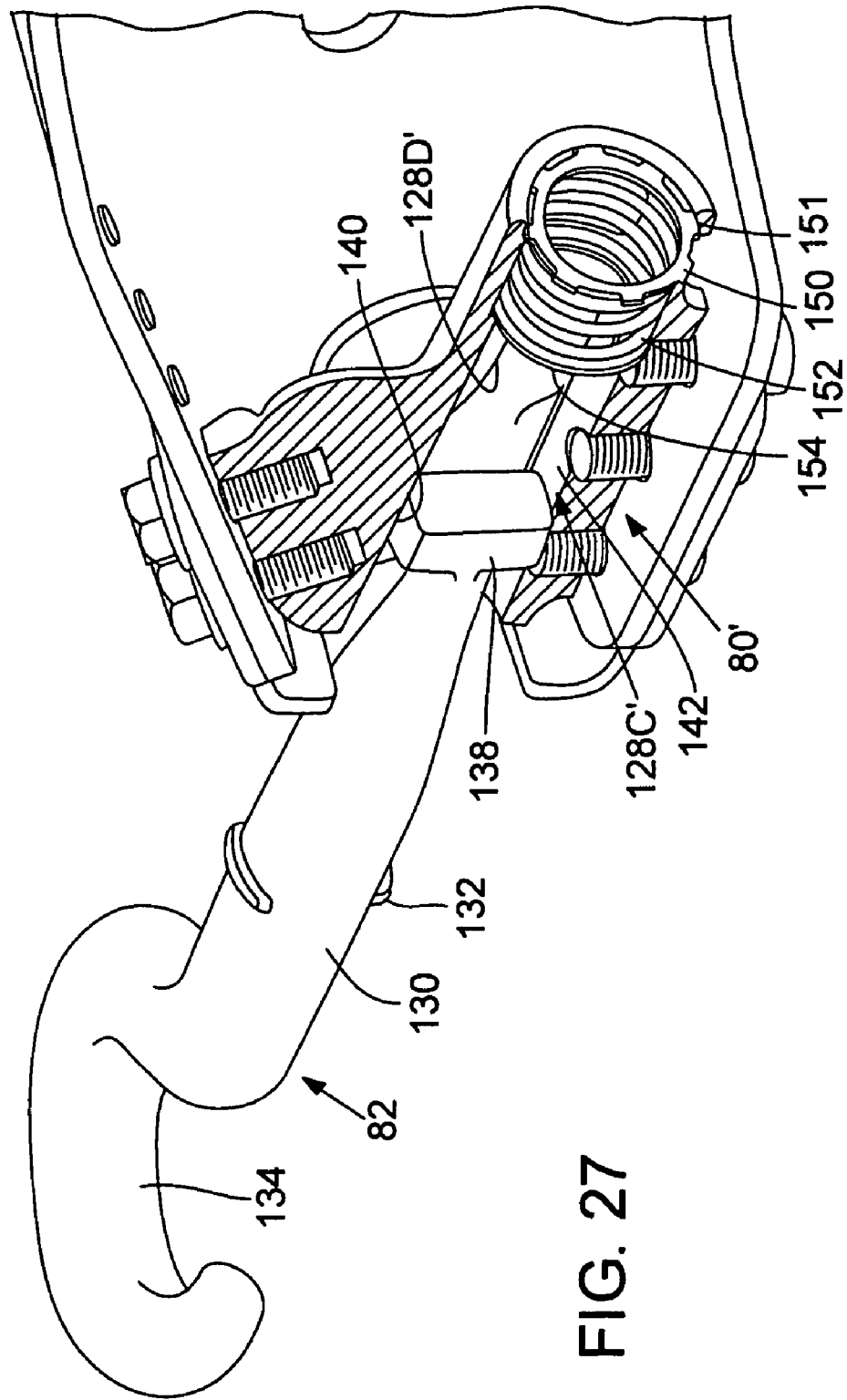
FIG. 27 illustrates an exemplary tow hook being inserted into a receptacle or housing of the FIG. 25 embodiment.

FIG. 27 illustrates the tow hook 82 partially inserted into the receptacle or housing 80' with the locking end portion 138 of the illustrated form of tow hook oriented to slide inwardly along channels 140,142 of the housing passageway.

FIG. 28 illustrates the tow hook in a position with the locking end portion 138 inserted deeply into the receptacle or housing 80' to a location within the housing wherein clearance is provided to permit rotation of the tow hook. The spring 152 is visible through gaps 160,162 in the side portions of the housing or receptacle 80' with the gaps also providing clearance to permit rotation of the tow hook when in the position shown in FIG. 28.

In FIG. 29, the tow hook has been rotated 90 degrees from the position shown in FIG. 28 (it should be noted that both FIGS. 28 and 29 show a horizontal sectional view of the housing or receptacle 80' looking down from above). In FIG. 29, the locking end portion 138 in the illustrated form has been shifted forwardly compared to the position shown in FIG. 28 following rotation of the locking end portion through 90 degrees. When in this position, the locking end portion is received within section 128D' of the housing. As can be seen in FIG. 29, the spring 152 assists in holding the tow hook in the locked position.

Figure 30:
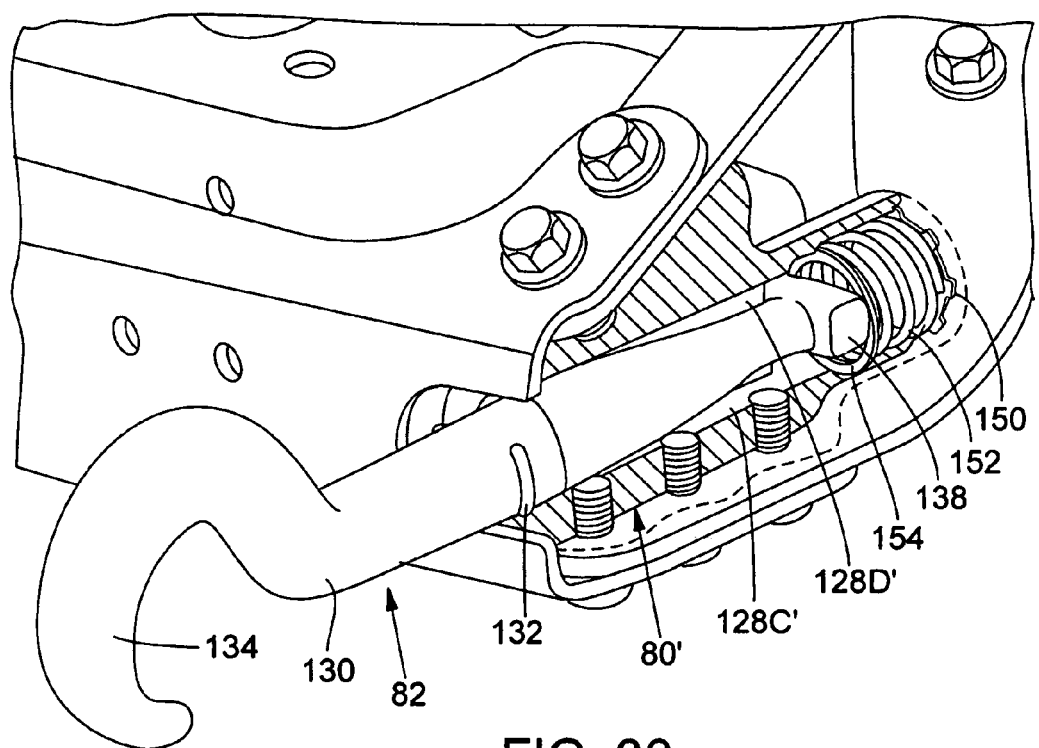
FIG. 30 is another view of the tow hook of FIG. 29 in the locking position.

FIG. 30 is another view of the tow hook when shifted to the position shown in FIG. 29.

Figure 31:
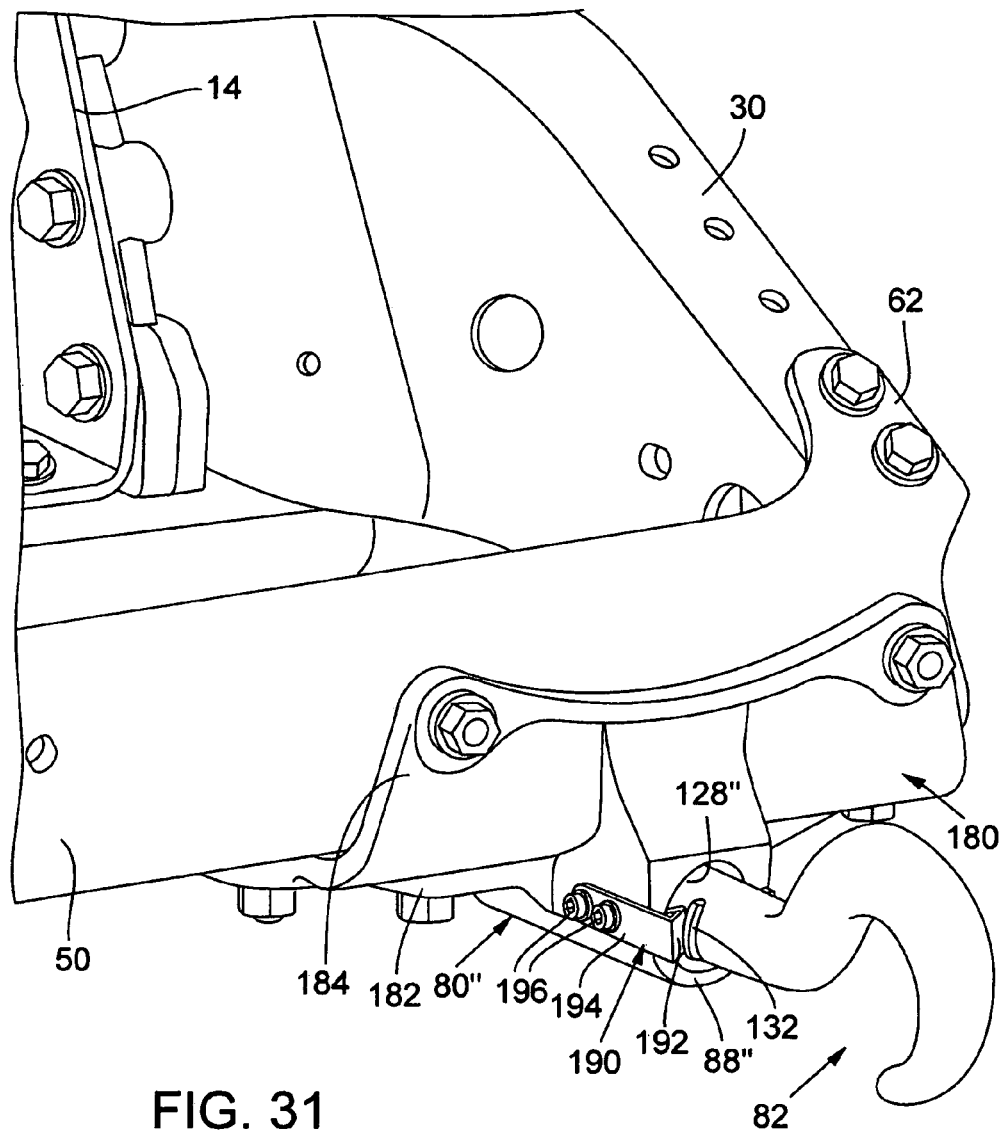
FIG. 31 is a perspective view of a tow hook assembly of yet another embodiment.

FIG. 31 illustrates an alternative embodiment wherein the tow hook receiving housing 80" has an internal passageway configured like the passageways of FIGS. 6-12 or FIGS. 26-30 except that, to shorten the length of the housing, the coil spring receiving portion of the housing (see spring 152 in FIG. 30) and coil spring is eliminated. In FIG. 31, the housing 80" is formed as an integral portion of a mounting bracket 180, having in this example, an upright flange portion 184 and a rearwardly projecting flange portion 182. Flange portion 184 is mounted to a front surface of cross member 50 and flange portion 182 is mounted to a lower surface of the cross member. The housing passageway extends below the cross member and is accessed by inserting a tow hook into opening 128" leading to the passageway. When rotated to its towing position, a projection 132 is engaged at a rear surface thereof by a projecting end portion 192 of a retention spring 190 having a leg portion 194 coupled to housing 80", such as by fasteners 196. Spring 190 biases the tow hook forwardly to assist in retaining the locking end portion of the tow hook (not shown in FIG. 31) in the locking end portion receiving recess. The spring tip 192 is pushed clear of projection 132 to allow rearward movement of the tow hook to a position where the tow hook can be rotated to an orientation to permit removal of the tow hook.

Having illustrated the principles of our invention with reference to several embodiments, it should be apparent to those of ordinary skill in the art that the invention may be modified in arrangement and detail without departing from such principles. We claim as our invention all modifications that fall within the scope of the foregoing disclosure. The invention encompasses all novel and non-obvious features and method acts disclosed and apparent from the forgoing disclosure, both alone and in various combinations and sub-combinations with one another. The invention is not limited to structures or method acts that have all of the features or method acts set forth herein or that solve any one or more advantages described herein.

We claim:

1. A tow hook assembly comprising:
a tow hook comprising an elongated tow hook body comprising a first towing end portion and a second locking end portion, the locking end portion having a first cross-sectional configuration;

a housing comprising a housing body that defines a tow hook receiving passageway with a tow hook receiving opening communicating with the tow hook receiving passageway, the passageway comprising a first section adjacent to the tow hook receiving opening, the first section having a cross-sectional configuration shaped such that the locking end portion is insertable in a first direction through the tow hook receiving opening and through the first section when the tow hook is in a first rotational orientation and such that the locking end portion is not insertable through the first section when the tow hook is in a second rotational orientation, the passageway comprising a second section positioned in the first direction from the first section, the second section having a cross-sectional configuration shaped such that the locking end portion is insertable in the first direction through the second section when the tow hook is in the first rotational orientation, the passageway comprising a third section positioned in the first direction from the second section, the third section having a cross-sectional configuration that permits rotation of the locking end portion from the first rotational orientation to the second rotational orientation when the locking end portion is inserted in the first direction through the second section and into the third section, the second section of the passageway having a locking end portion receiver portion that is shaped to receive the locking end portion upon rotation of the locking end portion to the second rotational orientation and shifting of the locking end portion in a second direction opposite to the first direction and toward the second section of the passageway from the third section of the passageway, rotation of the locking end portion to the first orientation being prevented when the locking end portion is received by the receiver portion; and wherein shifting of the locking end portion in the first direction from the receiver portion and into the third section allows rotation of the locking end portion to the first rotational orientation for removal of the locking end portion in the second direction through the second section, through the first section and from the housing.

2. An apparatus according to claim 1 wherein the first, second and third sections abut one another.

3. An apparatus according to claim 1 wherein the first section is spaced in the first direction from the tow hook receiving opening.

4. An apparatus according to claim 1 wherein the locking end portion is rectangular in cross-section and wherein the receiver portion comprises a recess that is rectangular in cross-section.

5. An apparatus according to claim 1 wherein the first and second rotational orientations are ninety degrees apart.

6. An apparatus according to claim 1 wherein the housing body is generally wedge-shaped.

7. An apparatus according to claim 1 wherein the housing body comprises a first upper bracket engaging surface and a second lower bracket engaging surface, wherein at least one of the first and second bracket engaging surfaces converge toward the other of the first and second bracket engaging surfaces along the housing body in the first direction.

8. An apparatus according to claim 1 wherein the tow hook locking end portion and received portion of the tow hook is received in the passageway of the housing body without fasteners or any retaining pins to retain the tow hook locking end portion and received portion of the tow hook body in the housing body.

9. An apparatus according to claim 1 wherein the tow hook body has a central portion intermediate the first towing end portion and second locking end portion and wherein the tow hook body necks down from the central tow hook body portion toward the locking end portion.

10. An apparatus according to claim 1 wherein the tow hook body comprises a central tow hook body portion intermediate the first towing end portion and the second locking end portion, the central tow hook body portion having a reduced cross-sectional dimension at a first location adjacent to the locking end portion in comparison to the cross-sectional dimension of the central tow hook body portion at a second location spaced further away from the locking end portion than the first location.

11. An apparatus according to claim 1 wherein the towing end portion comprises one of a hook, a ring, or a towing cable or towing chain engaging portion.

12. An apparatus according to claim 1 in combination with a vehicle comprising first and second frame rails each having a respective forward end portion, a first mounting bracket coupled to the forward end portion of the first frame rail, the first mounting bracket comprising a forwardly projecting first tow hook receptacle supporting portion, a second mounting bracket coupled to the forward end portion of the second frame rail, the second mounting bracket comprising a forwardly projecting second tow hook receptacle supporting portion;
a cross member coupled to the first and second tow hook receptacle supporting portions;
a first of said housings coupled to the first tow hook receptacle supporting portion and a second of said housings coupled to the second tow hook receptacle supporting portion; and
a bumper positioned forwardly of the forward end portions of the first and second frame rails, the bumper having a first opening through which one end portion of a tow hook can be inserted through the bumper and into the tow hook receiving opening of the first housing, and the bumper having a second opening through which one end portion of a tow hook can be inserted through the bumper and into the tow hook receiving opening of the second housing.

13. An apparatus according to claim 12 wherein the first mounting bracket defines at least a portion of a first pocket for receiving the first housing and wherein the second mounting bracket defines at least a portion of a second pocket for receiving the second housing.

14. An apparatus according to claim 13 wherein each of the first and second housings is generally wedge shaped with a first upper bracket engaging surface and a second lower bracket engaging surface, at least one of the first and second bracket engaging surfaces converging toward the other of the first and second bracket engaging surfaces, wherein each of the first and second mounting brackets comprises respective upper and lower flanges at least one of which converges toward the other, the first and second bracket engaging surfaces of the first housing being mounted to the upper and lower flanges of the first mounting bracket to mount the first housing to the first mounting bracket, and the first and second bracket engaging surfaces of the second housing being mounted to the upper and lower flanges of the second mounting bracket to mount the second housing to the second mounting bracket.

15. An apparatus according to claim 12 wherein the cross member is positioned forwardly of the tow hook receiving openings of the first and second housings, the cross member having a first cross member opening positioned in front of the tow hook receiving opening of the first housing and a second cross member opening positioned in front of the tow hook receiving opening of the second housing, the first cross member opening being sized so as to permit insertion of a locking end portion of a tow hook through the first cross member opening and into the tow hook receiving opening of the first housing and the second cross member opening being sized to permit the insertion of a locking end portion of a tow hook through the second cross member opening and into the tow hook receiving opening of the second housing.

16. An apparatus according to claim 12 wherein the first mounting bracket defines at least a portion of a first pocket for receiving the first housing and wherein the second mounting bracket defines at least a portion of a second pocket for receiving the second housing, wherein each of the first and second housings is generally wedge shaped with a first upper bracket engaging surface and a second lower bracket engaging surface, at least one of the first and second bracket engaging surfaces converging toward the other of the first and second bracket engaging surfaces, wherein each of the first and second mounting brackets comprises respective upper and lower flanges at least one of which converges toward the other, the first and second bracket engaging surfaces of the first housing being mounted to the upper and lower flanges of the first mounting bracket to mount the first housing to the first mounting bracket, and the first and second bracket engaging surfaces of the second housing being mounted to the upper and lower flanges of the second mounting bracket to mount the second housing to the second mounting bracket, and wherein the cross member is positioned forwardly of the tow hook receiving openings of the first and second housings, the cross member having a first cross member opening positioned in front of the tow hook receiving opening of the first housing and a second cross member opening positioned in front of the tow hook receiving opening of the second housing, the first cross member opening being sized so as to permit insertion of a locking end portion of a tow hook through the first cross member opening and into the tow hook receiving opening of the first housing and the second cross member opening being sized to permit the insertion of a locking end portion of a tow hook through the second cross member opening and into the tow hook receiving opening of the second housing.

17. An apparatus according to claim 12 comprising a first tow hook for detachable connection to the first housing and a second tow hook for detachable connection to the second housing, each of the tow hooks comprising:
an elongated tow hook body comprising a first towing end portion and a second locking end portion;
wherein the locking end portion is generally rectangular in cross-section;
wherein the tow hook body tapers from a central portion toward the locking end portion; and
wherein the tow hook body is of a reduced cross-sectional dimension at a first location adjacent to the locking end portion in comparison to the cross-sectional dimension of the tow hook body at a central portion of the tow hook body midway between the towing end portion and locking end portion.

18. An apparatus according to claim 1 in combination with a vehicle comprising first and second frame rails and a cross member coupled to the first and second frame rails, the housing being coupled to the cross member.

19. A housing for mounting to a vehicle and for detachably receiving a tow hook locking end portion of a tow hook having a towing end portion projecting outwardly from the housing when the tow hook is detachably received by the housing, the housing comprising:

a housing body;

the housing body defining a passageway configured to detachably receive and detachably retain the tow hook locking end portion inserted therein;

the housing body defining a tow hook receiving passageway with a tow hook receiving opening communicating with the tow hook receiving passageway, the passageway comprising a first section adjacent to the tow hook receiving opening, the first section having a cross-sectional configuration shaped such that the locking end portion is insertable in a first direction through the tow hook receiving opening and through the first section when the tow hook is in a first rotational orientation and such that the locking end portion is not insertable through the first section when the tow hook is in a second rotational orientation, the passageway comprising a second section positioned in the first direction from the first section, the second section having a cross-sectional configuration shaped such that the locking end portion is insertable in the first direction through the second section when the tow hook is in the first rotational orientation, the passageway comprising a third section positioned in the first direction from the second section, the third section having a cross-sectional configuration that permits rotation of the locking end portion from the first rotational orientation to the second rotational orientation when the locking end portion is inserted in the first direction through the second section and into the third section, the second section of the passageway having a locking end portion receiver portion that is shaped to receive the locking end portion upon rotation of the locking end portion to the second rotational orientation and shifting of the locking end portion in a second direction opposite to the first direction and toward the second section of the passageway from the third section of the passageway, rotation of the locking end portion to the first orientation being prevented when the locking end portion is received by the receiver portion; and wherein shifting of the locking end portion in the first direction from the receiver portion and into the third section allows rotation of the locking end portion to the first rotational orientation for removal of the locking end portion in the second direction through the second section, through the first section and from the housing.

20. An apparatus according to claim 19 wherein the first and second rotational orientations are ninety degrees apart.

21. An apparatus according to claim 19 wherein the housing body is generally wedge shaped.

22. An apparatus according to claim 19 wherein the housing body comprises a first upper bracket engaging surface and a second lower bracket engaging surface, wherein at least one of the first and second bracket engaging surfaces converge toward the other of the first and second bracket engaging surfaces along the housing body in the first direction.

23. A tow hook for detachable connection to a tow hook receptacle, the tow hook comprising:

an elongated tow hook body comprising a first end portion and a second locking end portion; and wherein the locking end portion is generally rectangular in cross-section;

wherein the tow hook body tapers from a central portion toward the locking end portion.

24. An apparatus according to claim 23 wherein the tow hook body is of a reduced cross-sectional dimension at a first location adjacent to the locking end portion in comparison to the cross-sectional dimension of the tow hook body at a central portion of the tow hook body midway between the towing end portion and locking end portion.

25. A tow hook body according to claim 23 comprising a central portion having a raised stop surrounding at least a portion of the central portion of the tow hook body.

26. An apparatus according to claim 23 wherein the towing end portion comprises one of a hook, a ring or a cable or chain engaging portion.

27. A vehicle with a towing apparatus comprising:

first and second frame rails each having a respective forward end portion;

a first mounting bracket coupled to the forward end portion of the first frame rail, the first mounting bracket comprising a forwardly projecting first tow hook receptacle supporting portion;

a second mounting bracket coupled to the forward end portion of the second frame rail, the second mounting bracket comprising a forwardly projecting second tow hook receptacle supporting portion;

a cross member coupled to the first and second tow hook receptacle supporting portions;

a first tow hook receptacle coupled to the first tow hook receptacle supporting portion, the first tow hook receptacle comprising a first tow hook receiving passageway having a forwardly facing first tow hook opening communicating with the first tow hook receiving passageway, the first tow hook receiving passageway being configured to detachably receive and retain a tow hook inserted through the first tow hook opening and into the first tow hook receiving passageway;

a second tow hook receptacle coupled to the second tow hook receptacle supporting portion, the second tow hook receptacle comprising a second tow hook receiving passageway having a forwardly facing second tow hook opening communicating with the second tow hook receiving passageway, the second tow hook receiving passageway being configured to detachably receive and retain a tow hook inserted through the second tow hook opening and into the second tow hook receiving passageway; and a bumper positioned forwardly of the forward end portions of the first and second frame rails, the bumper having a first opening through which one end portion of a tow hook can be inserted through the bumper and into the first tow hook receiving opening of the first tow hook receptacle, and the bumper having a second opening through which one end portion of a tow hook can be inserted through the bumper and into the second tow hook receiving opening of the second tow hook receptacle; and wherein each of the first and second tow hook receptacles is generally wedge shaped with a first upper bracket engaging surface and a second lower bracket engaging surface, at least one of the first and second bracket engaging surfaces converging toward the other of the first and second bracket engaging surfaces, wherein each of the first and second mounting brackets comprises respective upper and lower flanges at least one of which converges toward the other, the first and second bracket engaging surfaces of the first tow hook receptacle being mounted to the upper and lower flanges of the first mounting bracket to mount the first tow hook receptacle to the first mounting bracket, and the first and second bracket engaging surfaces of the second tow hook receptacle being mounted to the upper and lower flanges of the second mounting bracket to mount the second tow hook receptacle to the second mounting bracket.

28. An apparatus according to claim 27 wherein each of the first and second tow hook receiving passageways comprises a first section adjacent to the tow hook receiving opening, the first section having a cross-sectional configuration shaped such that the locking end portion is insertable in a first direction through the tow hook receiving opening and through the first section when the tow hook is in a first rotational orientation and such that the locking end portion is not insertable through the first section when the tow hook is in a second rotational orientation, a second section positioned in the first direction from the first section, the second section having a cross-sectional configuration shaped such that the locking end portion is insertable in the first direction through the second section when the tow hook is in the first rotational orientation, the passageway comprising a third section positioned in the first direction from the second section, the third section having a cross-sectional configuration that permits rotation of the locking end portion from the first rotational orientation to the second rotational orientation when the locking end portion is inserted in the first direction through the second section and into the third section, the second section of the passageway having a locking end portion receiving recess that is shaped to receive the locking end portion upon rotation of the locking end portion to the second rotational orientation and shifting of the locking end portion in a second direction opposite to the first direction and toward the second section of the passageway from the third section of the passageway, rotation of the locking end portion to the first orientation being prevented when the locking end portion is in the locking end portion receiving recess; and wherein shifting of the locking end portion in the first direction from the locking end portion receiving recess and into the third section allows rotation of the locking end portion to the first rotational orientation for removal of the locking end portion in the second direction through the second section, through the first section, and from the housing.

29. An apparatus according to claim 28 comprising a first tow hook for detachable connection to the first tow hook receptacle and a second tow hook for detachable connection to the second tow hook receptacle, each of the tow hooks comprising:

an elongated tow hook body comprising a first towing end portion and a second locking end portion;

wherein the locking end portion is generally rectangular in cross-section;

wherein the tow hook body tapers from a central portion toward the locking end portion; and wherein the tow hook body is of a reduced cross-sectional dimension at a first location adjacent to the locking end portion in comparison to the cross-sectional dimension of the tow hook body at a central portion of the tow hook body midway between the towing end portion and locking end portion.

30. An apparatus according to claim 29 wherein the towing end portion comprises one of a hook, a ring or a cable or chain engaging portion.

\* \* \* \* \*